(12) United States Patent
Hsu et al.

(10) Patent No.: US 9,220,327 B2
(45) Date of Patent: Dec. 29, 2015

(54) CARRIER AND PACKING CASE USING THE SAME

(71) Applicant: BungBungame Inc., Taipei (TW)

(72) Inventors: San-Tai Hsu, Taipei (TW); Ko-Feng Chen, Taipei (TW); Tien-Fu Chung, Taipei (TW)

(73) Assignee: BungBungame Inc., Taipei (TW)

( * ) Notice: Subject to any disclaimer, the term of this patent is extended or adjusted under 35 U.S.C. 154(b) by 106 days.

(21) Appl. No.: 14/093,109

(22) Filed: Nov. 29, 2013

(65) Prior Publication Data

US 2014/0353180 A1    Dec. 4, 2014

(30) Foreign Application Priority Data

May 30, 2013    (TW) .............................. 102210111 U

(51) Int. Cl.
*A45C 11/00*    (2006.01)
*G06F 1/16*    (2006.01)
*H04B 1/3877*    (2015.01)

(52) U.S. Cl.
CPC .............. *A45C 11/00* (2013.01); *G06F 1/1628* (2013.01); *H04B 1/3877* (2013.01); *A45C 2011/001* (2013.01); *A45C 2011/002* (2013.01); *A45C 2011/003* (2013.01); *A45C 2200/15* (2013.01)

(58) Field of Classification Search
CPC .... B65D 5/506; B65D 2207/00; G06F 1/185; H04M 1/185; A45C 2011/002; A45C 2011/001; A45C 2011/003; F16M 11/12; F16M 11/06
USPC .............. 206/45.24, 45.2, 736, 320; 248/688, 248/455, 122.1, 166, 439, 436; 361/679.55; 455/575.8
See application file for complete search history.

(56) References Cited

U.S. PATENT DOCUMENTS

| | | | | |
|---|---|---|---|---|
| 4,432,152 A * | 2/1984 | Daenen | | 40/762 |
| 5,068,987 A * | 12/1991 | Tontarelli | | 40/753 |
| 7,364,126 B2 * | 4/2008 | Tsai et al. | | 248/188.8 |
| 8,132,670 B1 * | 3/2012 | Chen | | 206/320 |
| 8,201,687 B2 * | 6/2012 | Zeliff et al. | | 206/320 |
| 8,231,099 B2 * | 7/2012 | Chen | | 248/688 |

(Continued)

FOREIGN PATENT DOCUMENTS

| TW | M401960 | 4/2011 |
|---|---|---|
| TW | M411500 | 9/2011 |

(Continued)

OTHER PUBLICATIONS

Office action of counterpart application by Taiwan IP Office on Jun. 8, 2015.

*Primary Examiner* — Steven A. Reynolds

(57) ABSTRACT

A carrier and a packing case using the same for a portable electronic device having a rear surface and a side surface are provided, wherein the carrier comprises a rear plate, a frame and at least a supporting component. The rear plate has a first inner surface fitting the rear surface and a first outer surface opposite thereto, and the frame surrounds the rear plate and has a second inner surface fitting the side surface and a second outer surface respectively surrounding the first inner and outer surfaces. The supporting component is pivoted to the first and/or second outer surfaces. The supporting component can be received in the frame by being rotated toward the rear plate and attached on the first outer surface, and support the portable electronic device to stand up by being rotated away from the rear plate and extended out of the frame.

18 Claims, 6 Drawing Sheets

(56) References Cited

U.S. PATENT DOCUMENTS

| | | | |
|---|---|---|---|
| 8,382,059 B2 * | 2/2013 | Le Gette et al. | 248/460 |
| 8,459,453 B2 * | 6/2013 | Parker et al. | 206/320 |
| 8,567,748 B2 * | 10/2013 | Zhou et al. | 248/688 |
| 8,659,893 B2 * | 2/2014 | Chiou | 361/679.55 |
| 8,857,773 B2 * | 10/2014 | Krohn et al. | 248/122.1 |
| 8,934,237 B2 * | 1/2015 | Cheng | 361/679.55 |
| 8,983,559 B2 * | 3/2015 | Chiu | 455/575.8 |
| 2006/0050471 A1 * | 3/2006 | Chen | 361/681 |
| 2008/0016742 A1 * | 1/2008 | Hao | 40/753 |
| 2008/0253067 A1 * | 10/2008 | Liou et al. | 361/679 |
| 2009/0036174 A1 * | 2/2009 | Brandenburg et al. | 455/575.1 |
| 2010/0072334 A1 * | 3/2010 | Le Gette et al. | 248/176.3 |
| 2012/0118770 A1 * | 5/2012 | Valls et al. | 206/320 |
| 2012/0168323 A1 * | 7/2012 | Schmidt et al. | 206/45.24 |
| 2012/0199501 A1 * | 8/2012 | Le Gette et al. | 206/45.24 |
| 2012/0312955 A1 * | 12/2012 | Randolph | 248/688 |
| 2014/0174960 A1 * | 6/2014 | Zhu | 206/45.24 |
| 2014/0262855 A1 * | 9/2014 | Gandhi et al. | 206/45.24 |
| 2014/0332418 A1 * | 11/2014 | Cheung et al. | 206/45.2 |

FOREIGN PATENT DOCUMENTS

| | | |
|---|---|---|
| TW | 201137579 A | 11/2011 |
| TW | M451348 | 4/2013 |

* cited by examiner

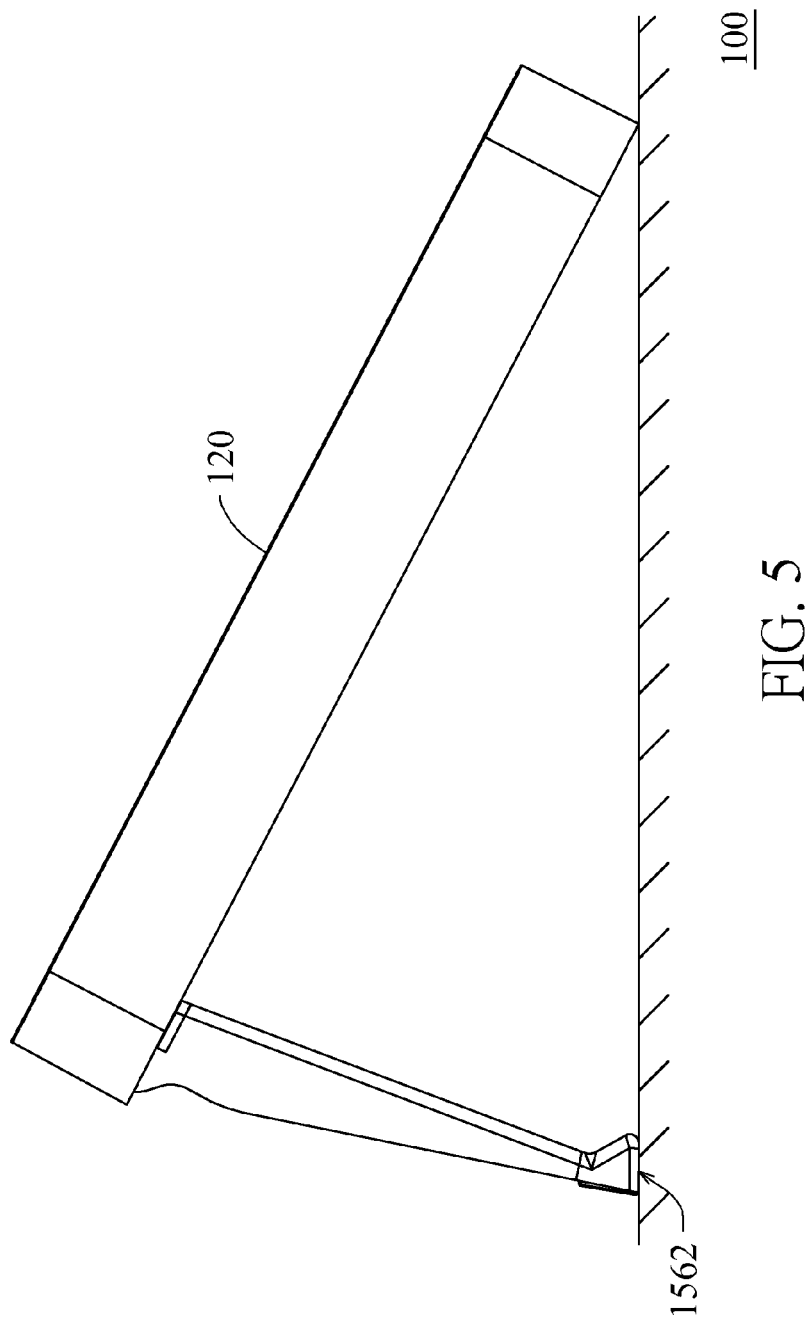

CARRIER AND PACKING CASE USING THE SAME

FIELD OF THE INVENTION

The present invention generally relates to a carrier suitable for a portable electronic device, and more particularly to a packing case using such a carrier.

DESCRIPTION OF THE RELATED ART

With the development of technology, various portable electronic devices, such as a multimedia player (MP3, MP4 and so on), a cell phone, a personal digital assistant (PDA), a smart phone, a hand-held game console, an electronic book (E-book), a tablet personal computer (tablet PC), a netbook, a notebook and so on, have become an integral part of modern life to many people. To compare with the traditional desktop PC, a main advantage of the portable electronic device is easy to get carry. Therefore, in recent years, we can see people operating the portable electronic devices anytime and anywhere.

In general, most of the portable electronic device packed within a packing case is made of paper or plastic together with its accessories, such as earphone, transmission line and so on, for sale. Thus, it is not only more aesthetic, but also more convenient for transportation and storage. Moreover, most of the commercially available packing case contains a carrier and at least a partition, wherein the carrier can be made of paper or plastic for carrying the portable electronic device, while the partition can be made of cardboard, plastic plate, foam material or bubble wrap and located under the carrier, so as to form a plurality of containing spaces for respectively receiving various accessories. Therefore, not only the total thickness of the conventional packing case is thicker, but also both of the carrier and the partition(s) are unable to be reused since they are merely designed for partitioning.

SUMMARY OF THE INVENTION

The present invention is directed to a carrier, which is capable of assisting a portable electronic device in standing up.

The present invention is further directed to a packing case, wherein the carrier thereof is capable of being not only reused, but also designed thinner.

The present invention provides a carrier suitable for a portable electronic device having a rear surface and a side surface surrounding the rear surface, wherein the carrier comprises a rear plate, a frame and at least a supporting component. The rear plate has a first inner surface fitting the rear surface and a first outer surface opposite to the first inner surface. The frame surrounds the rear plate and has a second inner surface and a second outer surface, wherein the second inner surface fits the side surface and surrounds the first inner surface, while the second outer surface surrounds the first outer surface. In addition, the supporting component is pivoted to at least one of the first outer surface and the second outer surface. Herein, the supporting component is capable of being received in the frame by being rotated toward the rear plate and attached on the first outer surface, and supporting the portable electronic device to stand up by being rotated away from the rear plate and extended out of the frame.

According to an embodiment of the present invention, the carrier further comprises at least a reinforced rib connecting the first outer surface and the second outer surface.

According to an embodiment of the present invention, the carrier further comprises at least a rib arranged on the first outer surface, wherein an accessory of the portable electronic device is capable of being received in the frame via the rib.

According to an embodiment of the present invention, the rear plate further has at least an exposing opening extending from the first inner surface to the first outer surface for exposing part of the rear surface.

According to an embodiment of the present invention, the rear plate further has at least an exposing opening extending from the first inner surface to the first outer surface for exposing at least a speaker of the portable electronic device.

According to an embodiment of the present invention, the rear plate and the frame are formed as an integral part by injection molding.

According to an embodiment of the present invention, the rear plate and the frame are made of rubber or Acrylonitrile Butadiene Styrene (ABS).

According to an embodiment of the present invention, at least one of the rear plate and the frame further has a first pivot portion, and the supporting component comprises a pivot member and a bracket. Herein, the bracket has a second pivot portion and a support portion, and the first pivot portion and the second pivot portion connect together via the pivot member, while the support portion extends outward from the second pivot portion. In a specific embodiment, each one of the first pivot portion and the second pivot portion can have a pivot aperture, and the pivot member can be a pivot shaft friction fit into the pivot apertures, wherein the pivot shaft can be close fit into one of the pivot apertures and loose fit into the other one of the pivot apertures. Further, in a specific embodiment, the second pivot portion can be assembled between the first pivot portion and the second outer surface. In addition, in a specific embodiment, the first pivot portion can further have at least a first position limiting portion, while the second pivot portion can further have a second position limiting portion capable of fastening with the first position limiting portion for limiting the rotation of the bracket. Herein, in a preferred embodiment, one of the first position limiting portion and the second position limiting portion can be a notch, while the other one of the first position limiting portion and the second position limiting portion can be a protrusion just capable of fastening with the notch. Moreover, in a preferred embodiment, the first pivot portion can have two first position limiting portions, wherein one of them can be disposed on an end of the first outer surface away from the first pivot portion, and the other one of them can be disposed between the first outer surface and the end. Also, in a specific embodiment, the first pivot portion can connect with at least one of the rear plate and the frame via at least a connecting plate. Moreover, in a specific embodiment, the support portion can comprise a foot capable of supporting the portable electronic device to stand up and a leg extending from the second pivot portion to the foot along an extension direction. Herein, in a preferred embodiment, the foot can be made of rubber for antiskid, while the leg can be made of ABS for higher strength. Also, in a preferred embodiment, the foot can have a first supporting surface and a second supporting surface, wherein the first supporting surface and a first edge of the frame adjacent to the supporting component can be essentially coplanar, and the second supporting surface and a second edge of the frame away from the supporting component can be essentially coplanar. Furthermore, in a preferred embodiment, cross-sectional contours perpendicular to the extension direction of both of the foot and the leg can be U-shaped. In addition, in a preferred embodiment, the leg can be extendable and retractable. Besides, in a preferred embodiment, the first pivot portion can further have a restriction for restricting a rotation range of the bracket.

The present invention also provides a packing case comprising a case, a cover capable of covering the case for forming a containing space and the carrier as claimed in claim 1, and the packing case is characterized in that both of the carrier and the portable electronic device are just capable of being contained in the containing space.

Accordingly, the carrier in the present invention can not only be contained in the containing space of the packing case for carrying the portable electronic device when the supporting component is received in the frame, but also support the portable electronic device to stand up when the supporting component is extended out of the frame. In comparison with the conventional packing case, the total thickness of the packing case of the present invention can be thinner since it is unnecessary to use any additional partition under the carrier.

BRIEF DESCRIPTION OF THE DRAWINGS

FIG. 5 illustrates a side view of a second usage of the carrier as illustrated in FIG. 1.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention. Besides, in all of the following embodiments, the same or similar components illustrated in different embodiments refer to the same symbols.

Figure 1:
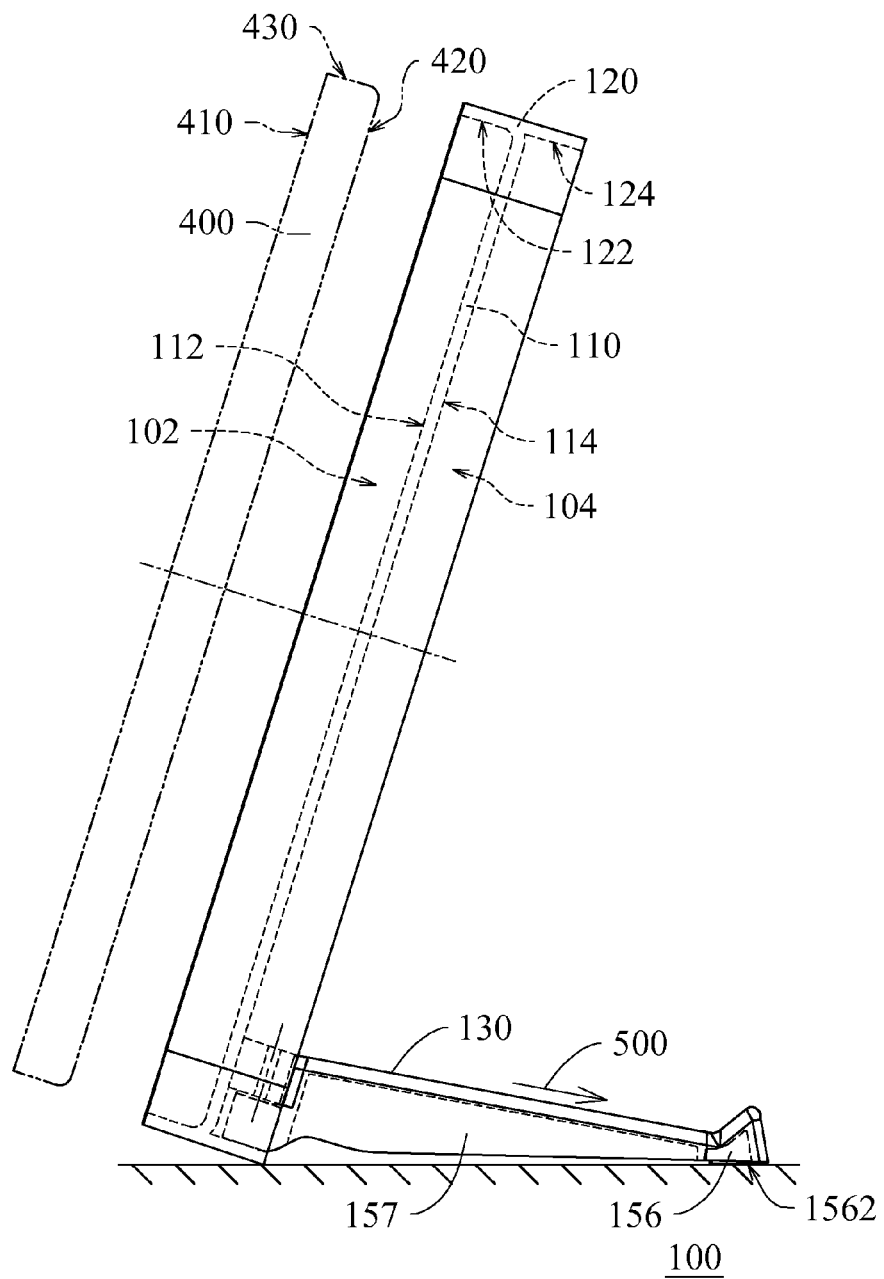
FIG. 1 illustrates a side view of a first usage of a carrier according to an embodiment of the present invention.
Figure 2:
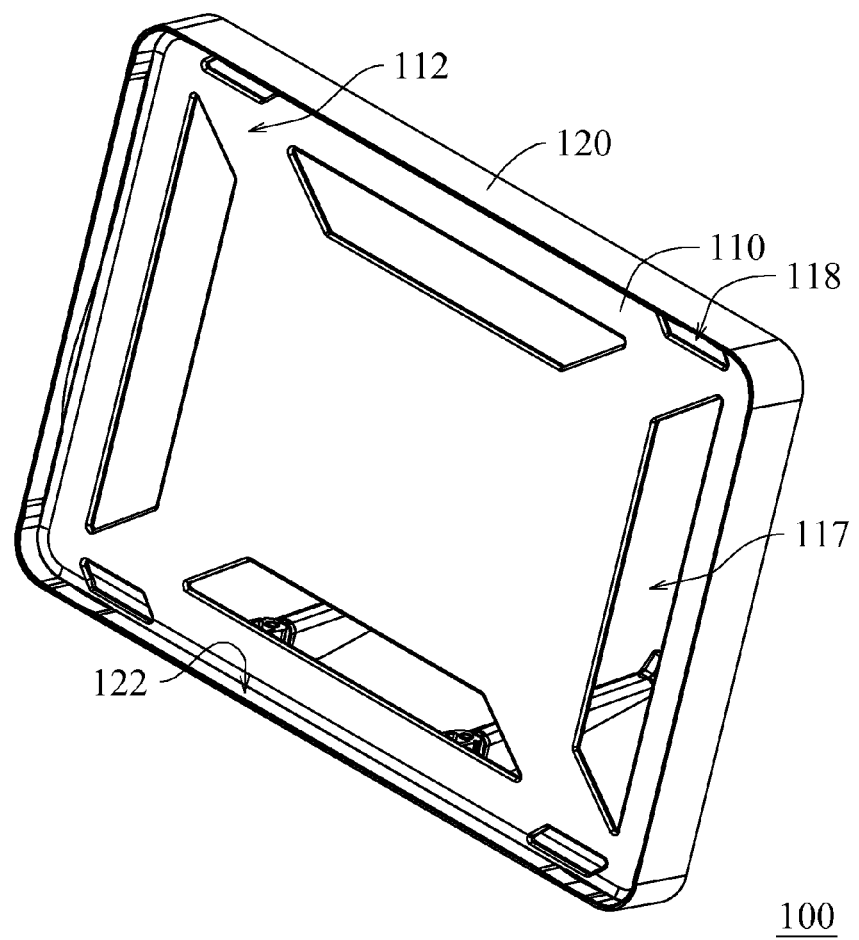
FIG. 2 illustrates a perspective view in a first orientation of the carrier as illustrated in FIG. 1.
Figure 3:
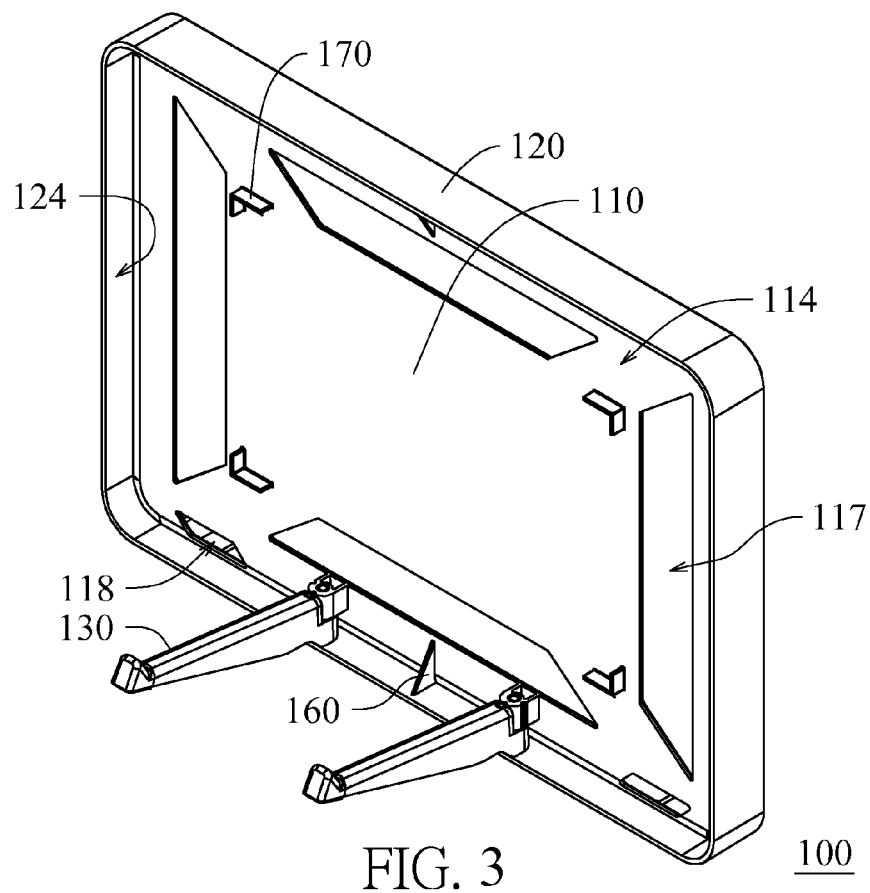
FIG. 3 illustrates a perspective view in a second orientation of the carrier as illustrated in FIG. 1.
Figure 4:
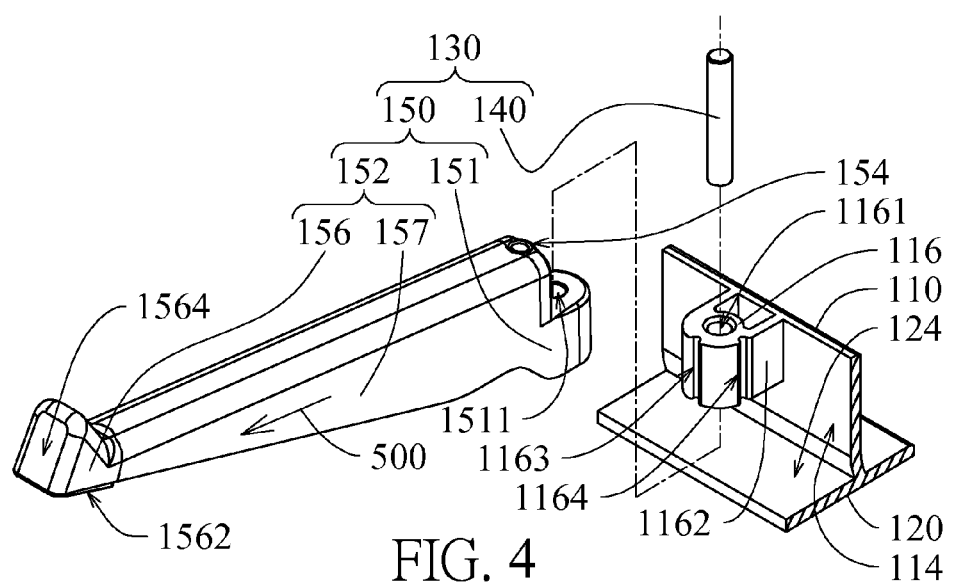
FIG. 4 illustrates an explosion view of the supporting component as illustrated in FIG. 1.

FIG. 1 illustrates a side view of a first usage of a carrier according to an embodiment of the present invention, while FIG. 2 illustrates a perspective view in a first orientation of the carrier as illustrated in FIG. 1. In addition, FIG. 3 illustrates a perspective view in a second orientation of the carrier as illustrated in FIG. 1, while FIG. 4 illustrates an explosion view of the supporting component as illustrated in FIG. 1. Moreover, FIG. 5 illustrates a side view of a second usage of the carrier as illustrated in FIG. 1. In the following embodiments, the same or similar components illustrated in different embodiments refer to the same symbols. In addition, all of the upper side, the lower side, the left side and the right side described in the present embodiment refer to the orientation of FIG. 1.

Referring to FIG. 1 first, the carrier 100 provided in the present invention is suitable for a portable electronic device 400, wherein the portable electronic device 400 can have a display surface 410, a rear surface 420 opposite to the display surface 410 and a side surface 430 surrounding and connecting the display surface 410 and the rear surface 420. Besides, in the following embodiments, the portable electronic device 400 is exemplarily illustrated as a tablet PC. However, in other non-illustrated embodiments, the portable electronic device can further be various unfoldable portable electronic devices, such as a multimedia player (MP3, MP4 and so on), a bar cell phone, a smart phone, a PDA, a hand-held game console, an E-book and so on. Alternatively, in some specific embodiments, the portable electronic device can be various foldable portable electronic devices, such as a hand-held game console, a netbook, a notebook and so on. In such a case, another display surface or the only display surface of the foldable portable electronic device can be flipped over as the foldable portable electronic device is unfolded.

In the present embodiment the carrier 100 comprises a rear plate 110, a frame 120 and at least a supporting component 130. The rear plate 110 has an inner surface 112 fitting the rear surface 420 and an outer surface 114 opposite to the inner surface 112. In addition, the frame 120 surrounds the rear plate 110 and has an inner surface 122 and an outer surface 124, wherein the inner surface 122 fits the side surface 430 and surrounds the inner surface 112, while the outer surface 124 surrounds the outer surface 114. Besides, the rear plate 110 and the frame 120 are, for example, formed as an integral part by injection molding. Therefore, the portable electronic device 400 can be contained in a containing space 102 surrounded by the inner surface 112 and the inner surface 122. In such an instance, the inner surface 112 can completely fit around the rear surface 420, while the inner surface 122 can completely fit around the side surface 430, so as to enable the portable electronic device 400 to stably lean against the rear plate 110 and the frame 120. It should be noted that even though the display surface 410 in the present embodiment is exemplarily illustrated as just even with or slightly lower than an upper edge of the frame 120 when it is contained in the containing space 102 (i.e. completely contained in the containing space 102). However, in other non-illustrated embodiments, the display surface can be slightly higher than the upper edge of the frame (i.e. slightly protruding out of the containing space) as well.

Furthermore, the supporting component 130 is pivoted to at least one of the outer surface 114 and the outer surface 124. Hence, the supporting component 130 can not only be used for supporting the portable electronic device 400 to stand up by being rotated away from the rear plate 110 and extended out of a containing space 104 surrounded by the outer surface 114 and the outer surface 124 as illustrated by FIG. 1 and FIG. 3, but also be received in the containing space 104 by being rotated toward the rear plate 110. As illustrated in FIG. 3, the carrier 100 in the present embodiment is exemplarily illustrated as including two symmetrical supporting components 130. However, in other non-illustrated embodiments, the carrier can comprise either a single supporting component aligning centrally or at least three supporting components averagely arranged. Furthermore, in yet other non-illustrated embodiments, the two supporting components can be arranged in dissymmetrical ways. For example, the two supporting components 130 as illustrated in FIG. 3 can be received in the containing space 104 by being rotated to opposite directions. However, in other non-illustrated embodiments, the two supporting components can also be received in the containing space by being rotated to the same or different directions.

In detail, referring to FIG. 3 and FIG. 4, in the present embodiment, the rear plate 110 further has a pivot portion 116, and the supporting component 130 is, for example, composed of a pivot member 140 and a bracket 150. In the present embodiment, the bracket 150 is, for example, composed of a pivot portion 151 and a support portion 152, and the pivot portion 116 and the pivot portion 151 can connect together via the pivot member 140, while the support portion 152 extends outward from the pivot portion 151. Besides, as illustrated in FIG. 3 and FIG. 4, the pivot portion 151 is preferably assembled between the pivot portion 161 and the outer surface 124, so as to restrain the bracket 150 therebetween. Moreover, as illustrated in FIG. 4, the pivot portion 116 can have a pivot aperture 1161, and the pivot portion 151 can have a pivot aperture 1511, while the pivot member 140 can be a pivot shaft friction fit into the pivot apertures 1161, 1151. Herein, the pivot shaft 140 can be close fit into the pivot aperture 1161 but loose fit into the pivot aperture 1511, and thus the bracket 150 can not only be extended out of the containing space 104 as illustrated in FIG. 1 and FIG. 3 by being rotated relative to the pivot portion 116, but also be received in the containing space 104 by being rotated relative to the pivot portion 116, and vice versa.

In addition, the pivot portion 116 connects on the outer surface 114, for example, via two connecting plates 1162, and can further have two position limiting portions 1163, 1164, wherein the position limiting portion 1163 can be disposed on an end of the pivot portion 116 away from the outer surface 114, while the position limiting portion 1164 can be disposed between the outer surface 114 and the position limiting portion 1163. In addition, the bracket 150 can further have another position limiting portion 154 disposed on a side of the support portion 152 adjacent to the pivot portion 151. Herein, each one of the position limiting portions 1163, 1164 can be a notch, while the position limiting portion 154 can be a protrusion just capable of fastening with the notch for limiting the rotation of the bracket 150 relative to the pivot portion 116, and vice versa. As a result, the bracket 150 extended out of the containing space 104 as illustrated in FIG. 1 and FIG. 3 is held by fastening the position limiting portion 154 and the position limiting portion 1163 together. In contrast, the bracket 150 can also be held within the containing space 104 by fastening the position limiting portion 154 and the position limiting portion 1164 together.

Moreover, as illustrated in FIG. 4, in the present embodiment, the support portion 152 can be composed of a foot 156 and a leg 157 extending from the pivot portion 151 to the foot 156 along an extension direction 500. Here, all of the rear plate 110, the frame 120 and the leg 157 can be made of ABS or other plastic materials with higher strength. In contrast, the foot 156 can be made of rubber for antiskid, so as to enable the foot 156 not likely to slide relative to the carrying surface, and can have two supporting surfaces 1562, 1564. Herein, as illustrated in FIG. 1 and FIG. 3, the supporting surface 1562 and an edge of the frame 120 adjacent to the supporting component 130 (i.e. the lower edge as illustrated in FIG. 1 and FIG. 3) can be essentially coplanar, and the supporting surface 1564 and another edge of the frame 120 away from the supporting component 130 (i.e. the upper edge as illustrated in FIG. 1 and FIG. 3) can be essentially coplanar. Hence, the carrier 100 can support the portable electronic device 400 to stably stand up not only in a larger inclination angle via the supporting surface 1562 together with the frame 120 as illustrated in FIG. 1 and FIG. 3 for enabling users to watch pictures or videos, but also in a smaller inclination angle via the supporting surface 1562 together with the frame 120 as illustrated in FIG. 5 for enabling users to key in. Besides, in other embodiments, all of the rear plate 110, the frame 120 and the leg 157 can be made of rubber instead.

Besides, in order to significantly reduce a total weight of the bracket 150 without decreasing the strength, the support portion 152 can be designed as a hollow structure as illustrated in FIG. 1, i.e. cross-sectional contours perpendicular to the extension direction 500 of both of the foot 156 and the leg 157 can be designed as U-shaped. In contrast, in other non-illustrated embodiments, the support portion can be integrally formed as a solid structure for higher strength. Further, a length of the leg 157 in the present embodiment is exemplarily designed as constant, however, a length of the leg in other non-illustrated embodiments can also be designed as extendable and retractable instead, so as to enable the inclination angle of the portable electronic device to be adjusted by varying the length of the leg according to the requirement of users.

It should be noted that, referring to FIG. 2 and FIG. 3, in the present embodiment, the display surface 410 is possibly slightly higher than or just even with the upper edge of the frame 120 (slightly lower than the upper edge of the frame 120 is also possible) when the portable electronic device 400 is contained in the containing space 102. Hence, as illustrated in FIG. 2 and FIG. 3, the rear plate 110 in the present embodiment can further have at least an exposing opening 117 (there are four symmetrical exposing openings 117 illustrated in the present embodiment) extending from the inner surface 112 to the outer surface 114 for exposing part of the rear surface 420, so as to enable users to take the portable electronic device 400 out of the containing space 102 by pushing the rear surface 420 via the exposing opening 117. Furthermore, the rear plate 110 can further have at least an exposing opening 118 (there are four symmetrical exposing openings 118 illustrated in the present embodiment) extending from the inner surface 112 to the outer surface 114 for exposing at least a speaker (not shown) of the portable electronic device 400. Herein, the number, the location and the contour of the exposing opening 118 can just correspond to those of the speaker, but the number of the exposing opening 118 can more than that of the speaker instead, and the contour of the exposing opening 118 can also different from that of the speaker.

In addition, as illustrated in FIG. 3, the carrier 100 in the present embodiment can further comprise at least a reinforced rib 160 (there are two symmetrical reinforced ribs 160 arranged vertically as illustrated in FIG. 3 of the present embodiment) connecting the outer surface 114 and the outer surface 124 for reinforcing a connection between the rear plate 110 and the frame 120. Besides, the carrier 100 can further comprise at least a rib 170 (there are four L-shaped ribs 170 arranged symmetrically as illustrated in the present embodiment) arranged on the outer surface 114. The rib 170 can not only reinforce the strength of the rear plate 110, but also separate the containing space 104 into a plurality of partitions (for example, a partition located inside and another partition located outside the four ribs 170 as illustrated in FIG. 3), so as to separately receive different accessories (not shown) of the portable electronic device 400, such as transmission lines, earphones, and so on. Moreover, the accessories can also be respectively received in the containing space 104 by winding around different ribs 170 instead. For example, in some specific embodiments, an adapter (not shown) of the portable electronic device 400 can be just fastened between the four ribs 170 as illustrated in FIG. 3, while a cable thereof can be wound around the four ribs 170.

Figure 7:
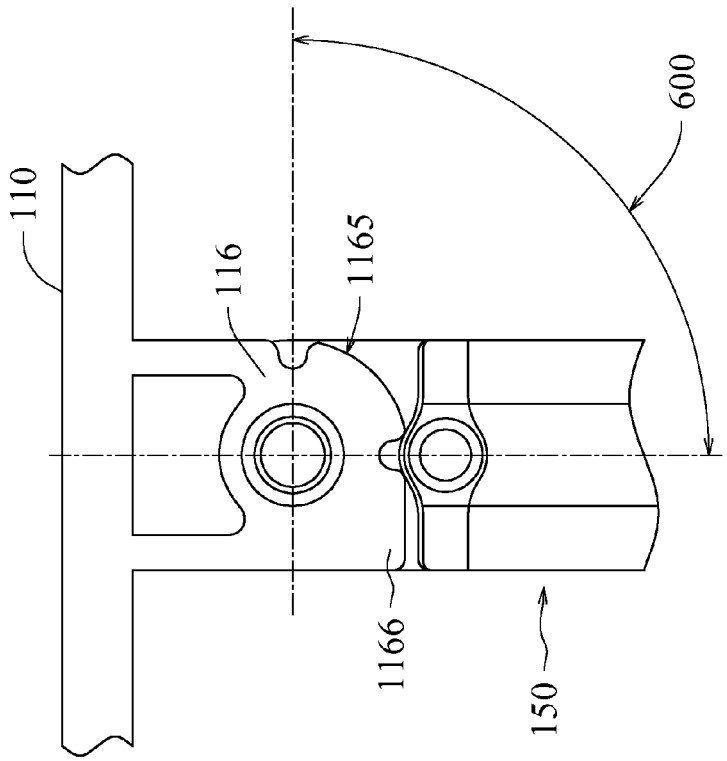
FIG. 7 illustrates a top view of a supporting component of a carrier according to another embodiment of the present invention.
Figure 6:
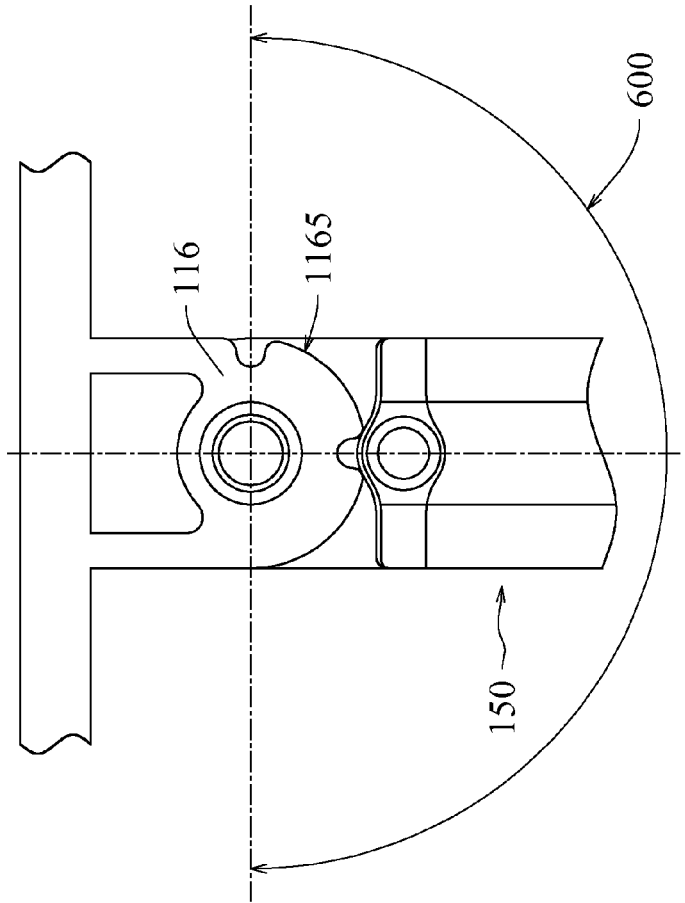
FIG. 6 illustrates a top view of the supporting component as illustrated in FIG. 1.

FIG. 6 illustrates a top view of the supporting component as illustrated in FIG. 1, and FIG. 7 illustrates a top view of a supporting component of a carrier according to another embodiment of the present invention. Referring to FIG. 6 first, in the present embodiment, a guide surface 1165 of the pivot portion 116 is designed without any restriction, for example, formed as a semi-cylindrical surface, so that a rotation range of the bracket 150 relative to the pivot portion 116 is 180 degrees as shown by an arrow 600. In contrast, referring to FIG. 7, the guiding surface 1165 can also be designed with a restriction 1166, for example, formed as a quad-cylindrical surface with a right angle surface as shown in FIG. 7, a semi-cylindrical surface with a protrusion (not shown) and so on, so that the rotation range of the bracket 150 relative to the pivot portion 116 in the present embodiment is restricted within 90 degrees as shown by the arrow 600.

Figure 8:
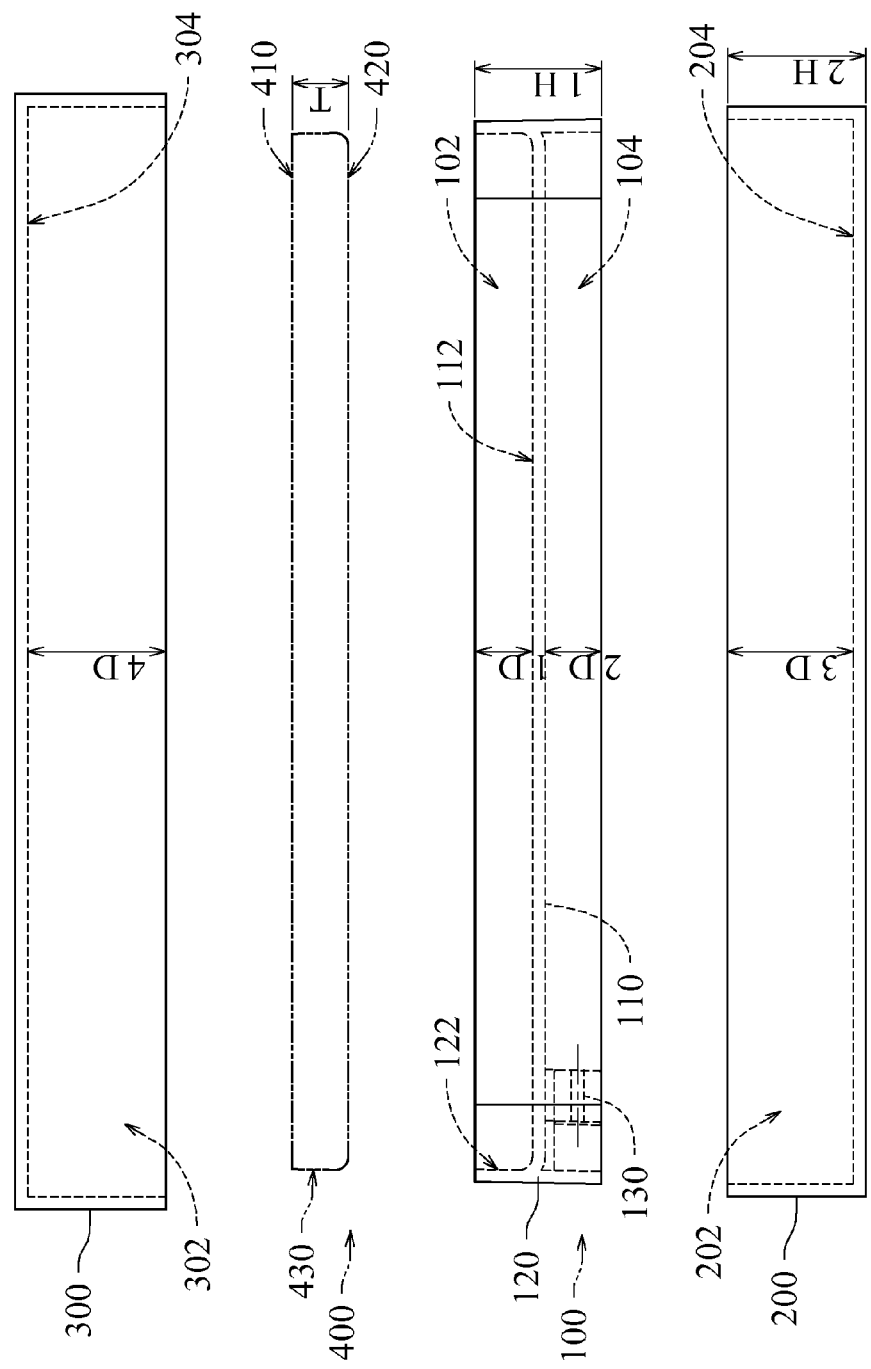
FIG. 8 illustrates an explosion side view of a packing case according to an embodiment of the present invention.

FIG. 8 illustrates an explosion side view of a packing case according to an embodiment of the present invention. Besides, all of the upper side, the lower side, the left side and the right side described in the present embodiment refer to the orientation of FIG. 8. Referring to FIG. 8, in a word, such a carrier 100 as illustrated in the previous embodiment can be applied to the packing case 10 as well, wherein the packing case 10 further comprises a case 200 and a cover 300 for covering the case 200, so as to form a containing space 202 just capable of containing both of the carrier 100 and the portable electronic device 400.

In detail, in the present embodiment, a depth D1 of a containing space 102 is essentially equal to a thickness T of the portable electronic device 400, and the inner surface 112 of the rear plate 110 and the inner surface 122 of the frame 120 respectively fit around the rear surface 420 and the side surface 430 of the portable electronic device 400. Therefore, the portable electronic device 400 stably leans against the rear plate 110 and the frame 120 and the display surface 410 thereof is just even with the upper edge of the frame 120 when it is contained in the containing space 102. Furthermore, a depth D2 of a containing space 104 is essentially equal to a thickness of a thickest one among all of the accessories (not shown) of the portable electronic device 400 and the supporting components 130, and a height H1 of the carrier 100 is essentially equal to a depth D3 of a containing space 202. As a result, a lower edge of the frame 120 can stably lean against an inner surface 204 of the case 200 when all of the accessories of the portable electronic device 400 and the supporting components 130 are received in the containing space 104 and the carrier 100 is received in the containing space 202. Moreover, a height H2 of the case 200 is essentially equal to a depth D4 of a containing space 302 of the cover 300. As a result, an upper edge of the case 200 can stably lean against an inner surface 304 of the cover 300 when all of the portable electronic device 400, the carrier 100 and the case 200 are received in the containing space 302 together. In another word, in contrast with the prior art, a total thickness of the packing case 10 provided in the present invention can be significantly reduced since it is slightly larger than the height H1 of the carrier 100.

In summary, the supporting component of the carrier of the present invention can be not only received in the frame for enabling the carrier to carry the portable electronic device in the containing space of the packing case, but also extended out of the frame for supporting the portable electronic device to stand up. Moreover, in comparison with the conventional art, the total thickness of the packing case can be significantly reduced by using such a carrier.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A carrier suitable for a portable electronic device, wherein the portable electronic device has a rear surface and a side surface surrounding the rear surface, and the carrier comprises:
   a rear plate, having a first inner surface fitting the rear surface and a first outer surface opposite to the first inner surface;
   a frame, surrounding the rear plate, and having a second inner surface fitting the side surface and surrounding the first inner surface and a second outer surface surrounding the first outer surface, wherein at least one of the rear plate and the frame further has a first pivot portion, and the first pivot portion has a first pivot aperture; and
   at least a supporting component, pivoted to at least one of the first outer surface and the second outer surface, wherein the supporting component is capable of being received in the frame by being rotated toward the rear plate and attached on the first outer surface, and supporting the portable electronic device to stand up by being rotated away from the rear plate and extended out of the frame, and the supporting component comprising:
   a bracket, having a second pivot portion and a support portion, wherein the second pivot portion has a second pivot aperture, and the support portion extends outward from the second pivot portion; and
   a pivot shaft, friction fit into the first pivot aperture and the second pivot aperture for connecting the first pivot portion and the second pivot portion together.

2. The carrier as claimed in claim 1, further comprising at least a reinforced rib connecting the first outer surface and the second outer surface.

3. The carrier as claimed in claim 1, further comprising at least a rib arranged on the first outer surface, wherein an accessory of the portable electronic device is capable of being received in the frame via the rib.

4. The carrier as claimed in claim 1, wherein the rear plate further has at least an exposing explosion opening extending from the first inner surface to the first outer surface for exposing part of the rear surface.

5. The carrier as claimed in claim 1, wherein the rear plate further has at least an exposing explosion opening extending from the first inner surface to the first outer surface for exposing at least a speaker of the portable electronic device.

6. The carrier as claimed in claim 1, wherein the rear plate and the frame are formed as an integral part by injection molding.

7. The carrier as claimed in claim 1, wherein the rear plate and the frame are made of rubber or ABS.

8. The carrier as claimed in claim 1, wherein the second pivot portion is assembled between the first pivot portion and the second outer surface.

9. The carrier as claimed in claim 1, wherein the first pivot portion further has at least a first position limiting portion, and the second pivot portion further has a second position limiting portion capable of fastening with the first position limiting portion for limiting the rotation of the bracket.

10. The carrier as claimed in claim 9, wherein one of the first position limiting portion and the second position limiting portion is a notch, and the other one of the first position limiting portion and the second position limiting portion is a protrusion just capable of fastening with the notch.

11. The carrier as claimed in claim 9, wherein the first pivot portion has two first position limiting portions, one of them is disposed on an end of the first outer surface away from the first pivot portion, and the other one of them is disposed between the first outer surface and the end.

12. The carrier as claimed in claim 1, wherein the first pivot portion connects with at least one of the rear plate and the frame via at least a connecting plate.

13. The carrier as claimed in claim 1, wherein the support portion comprises:
 a foot, capable of supporting the portable electronic device to stand up; and
 a leg, extending from the second pivot portion to the foot along an extension direction.

14. The carrier as claimed in claim 13, wherein the foot is made of rubber, while the leg is made of ABS.

15. The carrier as claimed in claim 13, wherein the foot has a first supporting surface and a second supporting surface, the first supporting surface and a first edge of the frame adjacent to the supporting component are essentially coplanar, and the second supporting surface and a second edge of the frame away from the supporting component are essentially coplanar.

16. The carrier as claimed in claim 13, wherein cross-sectional contours perpendicular to the extension direction of both of the foot and the leg are U-shaped.

17. The carrier as claimed in claim 1, wherein the first pivot portion further has a restriction for restricting a rotation range of the bracket.

18. A packing case, comprising a case, a cover capable of covering the case for forming a containing space and the carrier as claimed in claim 1, and characterized in that both of the carrier and the portable electronic device are just capable of being contained in the containing space.

* * * * *